(12) United States Patent
Blackburn et al.

(10) Patent No.: US 6,800,952 B2
(45) Date of Patent: Oct. 5, 2004

(54) METHOD OF PROTECTION AND FAULT DETECTION FOR STARTER/ALTERNATOR OPERATING IN THE STARTER MODE

(75) Inventors: Scott Evart Blackburn, Temperance, MI (US); Eric Keith Manning, Toledo, OH (US)

(73) Assignee: Dana Corporation, Toledo, OH (US)

( * ) Notice: Subject to any disclaimer, the term of this patent is extended or adjusted under 35 U.S.C. 154(b) by 148 days.

(21) Appl. No.: 10/303,711

(22) Filed: Nov. 26, 2002

(65) Prior Publication Data

US 2004/0036296 A1 Feb. 26, 2004

Related U.S. Application Data

(63) Continuation-in-part of application No. 10/173,312, filed on Jun. 18, 2002, now abandoned.

(51) Int. Cl.[7] .............................................. F02N 17/00
(52) U.S. Cl. ................. 290/36 R; 290/37 R; 290/38 R; 123/179.3
(58) Field of Search ................................ 290/37 A, 31, 290/34, 36 R, 37 R, 38 R, 47; 123/179.3

(56) References Cited

U.S. PATENT DOCUMENTS

| | | | | |
|---|---|---|---|---|
| 3,628,041 A | * | 12/1971 | Cummins et al. | ......... 290/37 R |
| 3,893,007 A | * | 7/1975 | Mori | .............................. 361/1 |
| 4,490,620 A | | 12/1984 | Hansen | |
| 4,947,051 A | * | 8/1990 | Yamamoto et al. | ....... 290/38 R |
| 5,188,070 A | | 2/1993 | Otsuka et al. | |
| 5,278,831 A | * | 1/1994 | Mabey et al. | ................ 370/349 |
| 5,495,127 A | * | 2/1996 | Aota et al. | ..................... 290/31 |
| 5,742,137 A | | 4/1998 | Bratton et al. | |
| 5,798,577 A | * | 8/1998 | Lesesky et al. | ............. 307/10.7 |
| 5,970,938 A | * | 10/1999 | Hisamoto et al. | ......... 123/179.3 |
| 6,024,065 A | * | 2/2000 | Hojna et al. | ............. 123/179.3 |
| 6,291,902 B1 | | 9/2001 | Ogane et al. | |
| 6,354,257 B1 | | 3/2002 | Marshall et al. | |

FOREIGN PATENT DOCUMENTS

JP  2000161189 A  *  6/2000  ........... F02N/11/08

* cited by examiner

*Primary Examiner*—Joseph Waks
(74) *Attorney, Agent, or Firm*—Liniak, Berenato & White

(57) ABSTRACT

A system of preserving a starter/alternator in an I.C. engine system installation from excessive operation in the starter mode is disclosed. The system describes a method of comparing the respective rotational speeds of the starter/alternator and I.C. engine in starter mode first to each other and then, if the same, to a predetermined threshold speed. If an overspeed condition is detected, disabling the starter/alternator in starter mode. In addition, if a predetermined number of I.C. engine start sequences have occurred without successful I.C. engine operation, the starter mode is disabled for a predetermined period of time. If several start failures have been detected, the starter/alternator can be disabled until a repair of the I.C. engine fault can be made. Where the respective rotational speeds of the starter/alternator and I.C. engine differ, the system controller follows a series of logic steps to determine the fault and thereafter either notify the system controller and/or disable the starter/alternator.

6 Claims, 2 Drawing Sheets

METHOD OF PROTECTION AND FAULT DETECTION FOR STARTER/ALTERNATOR OPERATING IN THE STARTER MODE

This application is a Continuation-in-Part of application Ser. No. 10/173,312, filed Jun. 18, 2002, abandoned, entitled Method for Protecting Starter/Alternator from Overspeed Condition.

FIELD OF THE INVENTION

The invention relates to the field of automotive electrical systems. Specifically, the invention is directed to a method of protecting the starter/alternator in an I.C. engine start-up sequence where the I.C. engine fails to start, and also to determine what type of fault condition is present.

BACKGROUND OF THE INVENTION

A recent trend in automotive electrical systems is the combining of the formerly separately functioning and operating starter and alternator/generator components. As automobiles become more electronics intensive, in terms of electronic accessories and sophistication of control systems, the need becomes greater for increased electrical supply. As a result, the alternator has become physically larger and more powerful as automotive electrical needs have increased.

In addition, the need for increasing operating efficiencies from I.C. engines mandates a powerful and frequently operated starter motor to resume I.C. engine operation on short demand cycles. And, while these separate trends have been in place, a third element always present in automotive design, is packaging efficiency in terms of underhood space. As these trends have progressed, a commonly proposed strategy is to combine the starter and alternator/generator into a single underhood element. In this regard, the starter function of the starter/alternator can be quite powerful vis-à-vis the I.C. engine being started inasmuch as the I.C. engine is required to achieve self-sustaining operation within ½ to 1 second of starter initiation. This design circumstance of a relatively powerful starter function vis-à-vis the IC engine can lead to results that are potentially undesirable. For example, in the circumstance where the I.C. fails to run of its own accord once the starter has engaged to start the I.C. engine, the starter may run in an overspeed condition and itself fail owing to the heat generated in the starter windings owing to the overspeed condition. In addition, other components in the starter/alternator system, i.e., battery and wiring to the starter, supporting circuits, and fusing may be used beyond design capacity if the non-starting I.C. engine condition is not detected, diagnosed, and instead is allowed to persist beyond a predetermined threshold.

SUMMARY OF THE INVENTION

The present invention is directed to solving at least one of the potential problems is associated with the trend towards combined starter and generator/alternator functions and short demand cycle I.C. engine operation. Specifically, the present invention proposes a method of sensing and diagnosing a non-starting condition where an I.C. engine start sequence is initiated and the I.C. engine fails to operate in a self sustaining manner. The non-starting condition can be sensed either directly from a rotation and/or position sensor mounted to the starter/alternator or, alternatively, the condition can be sensed from another I.C. engine driven accessory similarly equipped with a rotation and/or speed sensor or, most preferably, directly from the crank or cam position sensor on the I.C. engine itself. If an engine driven accessory is being checked, such an accessory may include, but not be limited to, an engine driven cooling fan, the waterpump, A/C compressor, or power steering pump.

DETAILED DESCRIPTION

Figure 1:
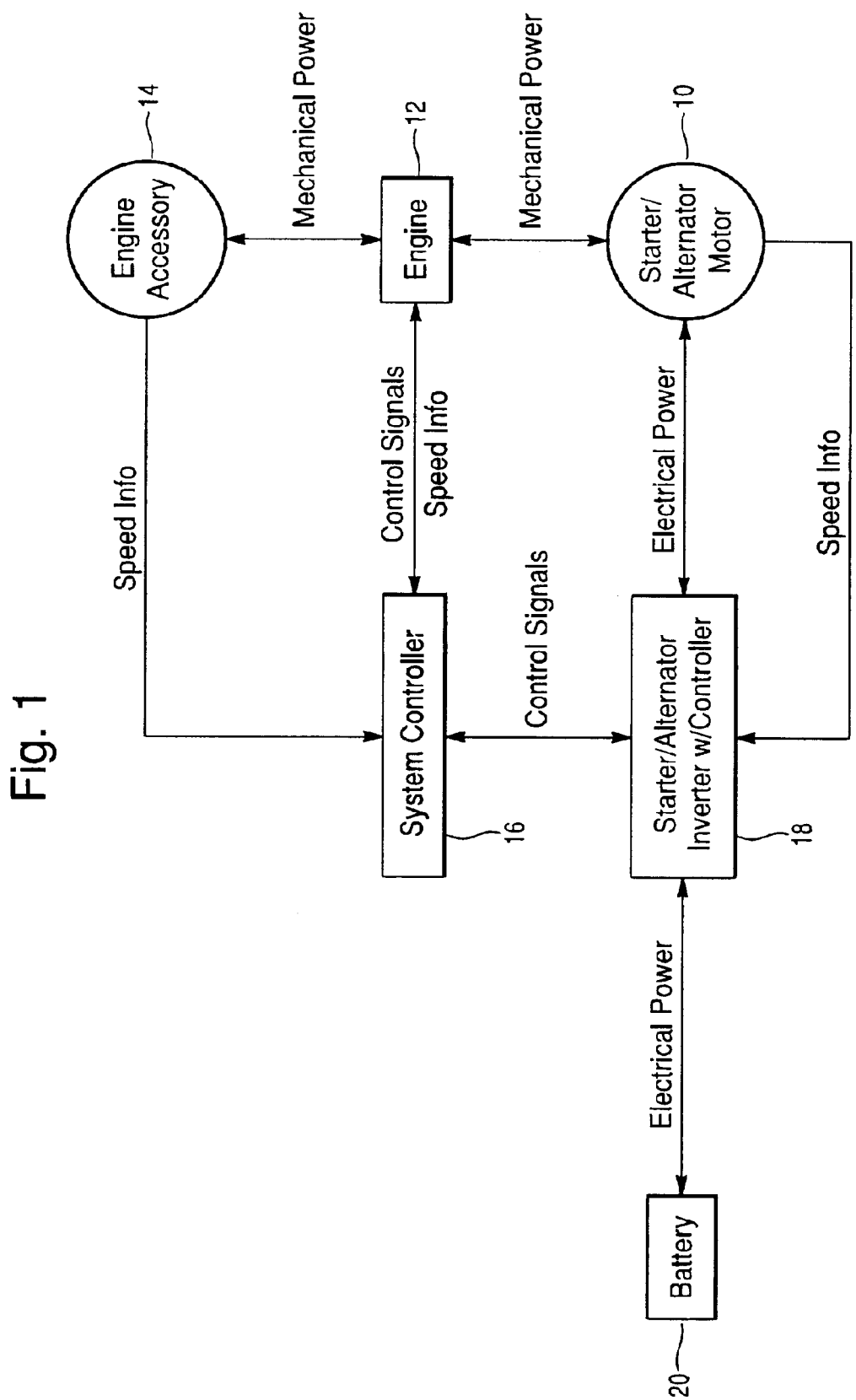
FIG. 1 shows a block diagram embodiment of the necessary sensors and hardware to accomplish the present invention.

The invention is directed to a method of controlling a starter/alternator 10 in an I.C. engine installation and is specifically directed to disabling the starter function and diagnosing a fault when a non-starting failure of the starter/alternator system has been detected. The starter/alternator 10 may be an integrated unit, i.e., in combination with the crankshaft mounted flywheel or balancer, or a separate belt, chain, or gear driven/driving unit. In any configuration, the unit 10 is used to start the I.C. engine according to a predetermined instruction, i.e., operator or accessory load demand, and is used to provide electrical power for either immediate consumption or for storage, i.e., battery charging. The alternator/starter 10 is directly coupled for rotation with the engine 12. The engine is equipped with various sensors for determining rotational speed, temperature, crank position, cam position, etc., and provides this information to a system controller 16. The controller 16 likewise receives and transmits operational information to and from the starter/alternator inverter having an associated controller to selectively choose either the starter or alternator function for the starter/alternator 10. A battery 20 is also a part of the system to provide electrical power to activate the starter/alternator when the starter function is selected. The engine 12 is also equipped with various engine driven accessories 14, for example, cooling fan, A/C, power steering, water pump, emissions pumps, camshaft, etc.

In order to protect the starter/alternator system during the starting mode process, the starter/alternator controller 18 will monitor the speed of the IC engine and the speed of the starter/alternator. At pre-determined intervals (i.e., 10 msec), the starter/alternator controller 18 will compare the relative speeds of the starter/alternator and the IC engine. If the speed of the starter/alternator and the IC engine are the same (taking into account gear ratios from pulleys and/or drive systems, etc.), then the system is functioning normally and IC engine self-sustaining operation should be imminent. If, however, the detected same speed is too fast, i.e., beyond a threshold of IC engine self-sustaining operation (i.e., 400 rpm), or if more than a determined number of IC engine revolutions has occurred, then the starter/alternator would cease operation in the starter mode and notify the vehicle operator of a fault detection.

Alternatively, if the speed of the starter/alternator is greater than the speed of the IC engine, and the speed of the IC engine is greater than zero, then the mechanical connection between the starter/alternator and the IC engine is malfunctioning. In the event where such a condition persists beyond a predetermined threshold where the starter/alternator continues in starter mode, the system controller is notified of the fault. If the condition is not self correcting within an acceptable number of engine revolutions, i.e., a dampened slipping belt does not dry out, the starter/alternator ceases cranking and the system controller is notified of the particular fault condition.

Alternatively, if the speed of the starter/alternator is greater than zero and the speed of the IC engine is zero, then the mechanical connection between the starter/alternator and the IC engine has failed completely. In this case, the starter/alternator would cease cranking and notify the system controller of the particular fault condition.

Alternatively, if the speed of the starter/alternator is zero, the starter/alternator has either failed or the IC engine has excessive load or has, itself, failed. In this condition, the starter/alternator will cease attempting to crank and notify the system controller of the particular fault condition.

Figure 2:
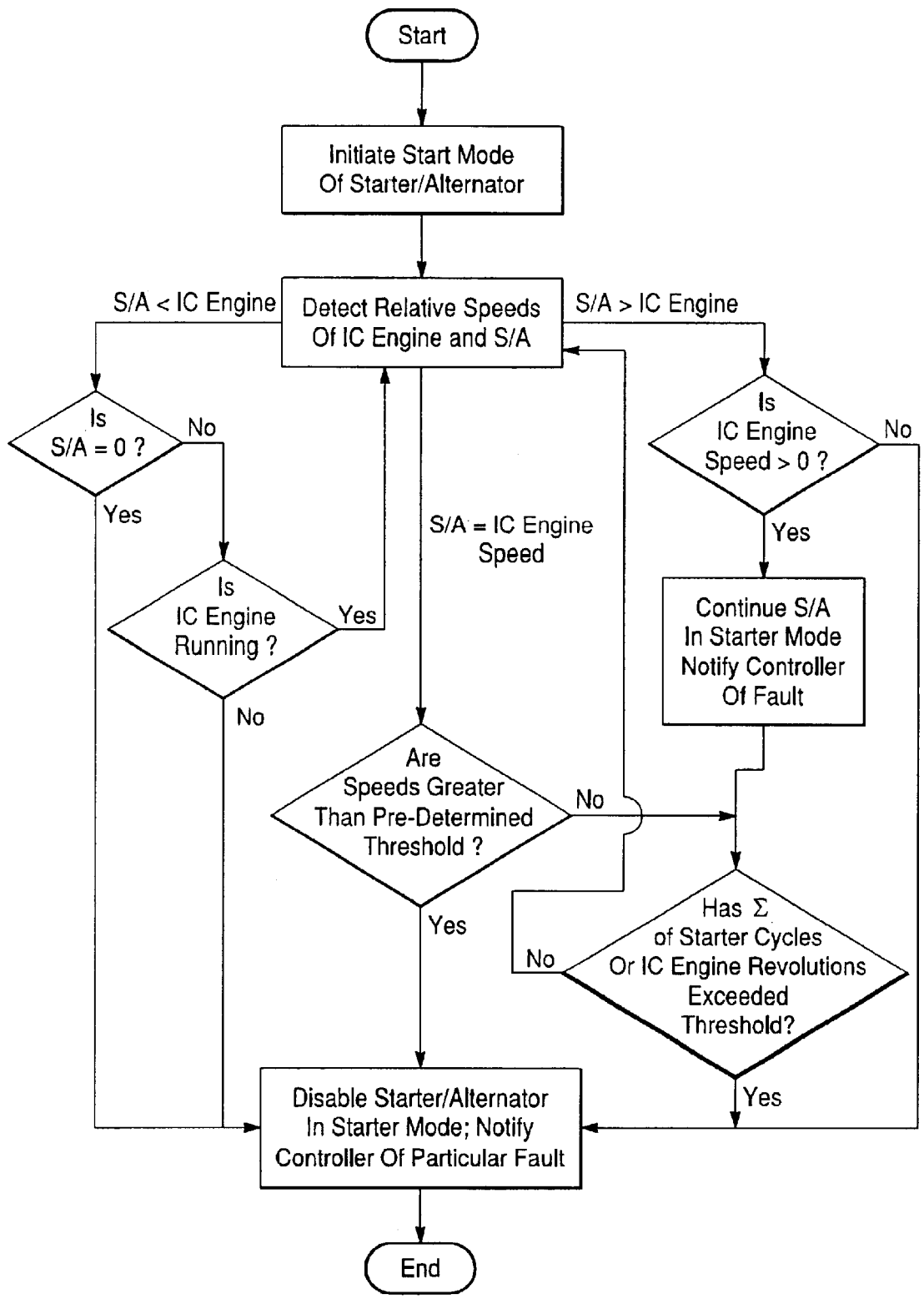
FIG. 2 shows a flow chart of decision making for the method used by the system controller to determine a starter/alternator overspeed condition.

FIG. 2 shows a block diagram for the logic sequence of the system controller 16 in using the method of the present invention. A start sequence is initiated for any predetermined reason, i.e, battery charging, accessory operation, vehicle acceleration, etc. The starter/alternator is placed into start mode. The engine speed is then checked by checking any engine driven component equipped with rotational speed sensors (taking into account speed differences with the engine and starter/alternator owing to pulley ratios, gear drive ratios, etc.) or by checking the crank or cam position sensor on the IC engine itself. A comparison is then made to determine if the detected speeds of the respective IC engine and the starter/alternator. If the relative speeds of the IC engine and the starter/alternator are the same but slower than necessary to start the IC engine, the starter/alternator can continue cycling to start the I.C. engine. If the detected speed is higher, ie, an overspeed condition is detected, then the starter/alternator is disabled and a fault indication is sent to the controller. In addition, if a predetermined number of cycles have occurred and I.C. engine operation is not detected, regardless of fault, the starter/alternator is disabled in starting mode for a predetermined period of time. In this embodiment, the system controller 16 would further include a counter and comparator to count successive starter mode cycles. Upon failure of the I.C. engine to operate following a preselected number of start sequences, the starter/alternator 10 would be disabled for a period of time sufficient to shed destructive heat in the system and to regain cranking capacity in the battery 20. A further embodiment would include a counter of total start failures and successive timed disablements so that the starter/alternator 10 could be restricted from initiating a start sequence until a repair of the I.C. engine 12 has been effected.

The foregoing method will improve the performance and overall reliability of the starter/alternator system by controlling and limiting excessive design capacity exceeding use. In accordance with the method, the starter/alternator system is preserved from destructive excessive operation. The specific limitations and parameters in the present inventive method for what is considered a starter/alternator IC engine system fault condition, excessive starter mode cycling, and the time period for sufficient cooling of the system is dependent upon the design criteria of the starter/alternator system. For example, the relative size, cylinder configuration, and compression ratio of the I.C. engine, the size, amp requirements, and capacity of the starter/alternator, the relative duration and frequency of the demand cycle on the I.C. engine, battery size and cranking capacity, system wiring and fusing, and expected operational starting criteria taking into account ambient conditions (i.e., how hot/cold, humid/dry, air pressure/density, etc.). If ambient conditions are relatively colder, longer starting cycles prior to disablement may be necessary, whereas in hotter conditions with less ability to shed heat, shorter starting cycles may be used. Regardless of design parameters, however, the applied method would follow the necessary detecting and comparison steps according to the predetermined criteria specified for the starter/alternator system being used.

Additional modifications and uses of the present method will occur to those of ordinary skill in the field upon reading of the foregoing specification and accompanying drawings. These descriptions of the invention herein are not to be considered limiting except as to the claims that follow.

We claim:

1. A method of protecting a starter/alternator system for initiating I.C. engine operation from excessive operation in a starter mode, comprising the steps of:

initiating a starting sequence to start an I.C. engine, detecting respective rotational speeds of said I.C. engine and said starter/alternator;

comparing said respective speeds and determining whether the respective speeds are the same and, if so, comparing said detected speed with a predetermined acceptable rotational speed; and, disabling said starter/alternator in said starter mode when said detected speed exceeds said predetermined acceptable rotational speed.

2. A method as in claim 1, further comprising:

detecting a number of successive non-successful I.C. engine starter sequence initiations to obtain a first detected number;

comparing said first detected number to a predetermined acceptable number of non-successful I.C. engine start sequences; and, disabling said starter/alternator in said starter mode for a predetermined period of time when said first detected number exceeds said predetermined acceptable number of non-successful I.C. engine start sequences.

3. A method as in claim 1, wherein:

said detecting step for said I.C. engine rotational speed is accomplished using a detected rotational speed of said I.C. engine crankshaft or camshaft.

4. A method as in claim 1, wherein:

said detecting step for said I.C. engine rotational speed is accomplished using a detected rotational speed of an I.C. engine driven accessory.

5. A method of protecting a starter/alternator system for initiating I.C. engine operation from excessive operation in a starter mode, comprising the steps of:

initiating a starting sequence to start an I.C. engine, detecting respective rotational speeds of said I.C. engine and said starter/alternator;

comparing said respective speeds and determining whether the respective speeds are the same and, if not, determining whether said IC engine speed or said starter/alternator is rotating faster, if said IC engine speed is faster, determining whether said starter/alternator speed is zero, and, where said starter alternator speed is zero, disabling said starter/alternator in said starter mode, and, where said starter/alternator speed is greater than zero, determining whether said IC is running and, if not, disabling said starter/alternator in said starter mode.

6. A method of protecting a starter/alternator system for initiating I.C. engine operation from excessive operation in a starter mode, comprising the steps of:

initiating a starting sequence to start an I.C. engine, detecting respective rotational speeds of said I.C. engine and said starter/alternator;

comparing said respective speeds and determining whether the respective speeds are the same and, if not, determining whether said IC engine speed or said starter/alternator is rotating faster, if said starter/alternator speed is faster, determining whether said I.C. engine speed is zero, and, where said I.C. engine speed is zero, disabling said starter/alternator in said starter mode, and, where said I.C. engine speed is greater than zero, notifying a system controller of a fault relating to the starter/alternator and I.C. engine, determining whether said IC engine is running and, if not, continuing said starter/alternator in said starter mode until a predetermined number of I.C. engine revolutions have occurred or until a predetermined number of I.C. engine start sequences have been performed and, thereafter, disabling said starter/alternator in said starter mode.

* * * * *